US010327590B1

(12) United States Patent
Moore et al.

(10) Patent No.: US 10,327,590 B1
(45) Date of Patent: Jun. 25, 2019

(54) CHARCOAL STARTER

(71) Applicants: Roger Paul Moore, Jonesboro, AR (US); Judith Ferguson Moore, Jonesboro, AR (US)

(72) Inventors: Roger Paul Moore, Jonesboro, AR (US); Judith Ferguson Moore, Jonesboro, AR (US)

(*) Notice: Subject to any disclaimer, the term of this patent is extended or adjusted under 35 U.S.C. 154(b) by 457 days.

(21) Appl. No.: 14/839,652

(22) Filed: Aug. 28, 2015

Related U.S. Application Data

(60) Provisional application No. 62/043,788, filed on Aug. 29, 2014.

(51) Int. Cl.
*C10L 5/36* (2006.01)
*A47J 37/07* (2006.01)

(52) U.S. Cl.
CPC .............. *A47J 37/079* (2013.01); *C10L 5/368* (2013.01)

(58) Field of Classification Search
CPC ....... A47J 37/079; F24B 15/005; C10L 11/04; C10L 5/368
See application file for complete search history.

(56) References Cited

U.S. PATENT DOCUMENTS

| | | | | | |
|---|---|---|---|---|---|
| 1,959,473 | A | * | 5/1934 | Heron | C10L 11/04 126/25 B |
| 3,010,809 | A | * | 11/1961 | Peck | A47J 37/0768 44/520 |
| 4,460,377 | A | * | 7/1984 | Kalil | C10L 11/04 44/520 |
| 4,503,835 | A | * | 3/1985 | Williams | A47J 37/079 126/25 B |
| 4,786,290 | A | * | 11/1988 | Wyer | C10L 11/04 44/519 |
| 7,670,392 | B2 | * | 3/2010 | Correa | C10L 5/36 44/530 |
| 7,823,576 | B2 | * | 11/2010 | Timmons | C10L 11/04 126/25 B |
| 2009/0095276 | A1 | * | 4/2009 | Kaye | A47J 37/079 126/25 B |

\* cited by examiner

*Primary Examiner* — David J Laux

(74) *Attorney, Agent, or Firm* — Schrantz Law Firm, PLLC; Stephen D. Schrantz

(57) ABSTRACT

The charcoal starter provides a housing with an upper chamber and a lower chamber. The housing is constructed from a combustible material that is sufficiently rigid to enable the housing to store and support an amount of charcoal within the upper chamber. A divider separates the upper chamber from the lower chamber. The divider supports the charcoal above the lower chamber. The lower chamber provides space for placement of paper or other combustible material, such as a combustible solid, within the lower chamber. A user lights the combustible material to start a fire and generate heat. The heat and fire from the lower chamber travels upward to the upper chamber to light the charcoal. The charcoal starter burns to ashes during use as the charcoal burns.

20 Claims, 12 Drawing Sheets

CHARCOAL STARTER

CROSS-REFERENCE TO RELATED APPLICATIONS

This application claims priority to and is a continuation in part of U.S. Patent Application No. 62/043,788 filed on Aug. 29, 2014 entitled Charcoal Starter.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention is in the field of lighting charcoal and outdoor grilling. More particularly, the present invention is in the technical field of lighting charcoal without the use of charcoal starter, lighter fluid, or other combustible fluids or the use of a charcoal chimney.

II. Known Art

Grillers may apply lighter fluid to the charcoal and then light the charcoal to start the fire. The user then waits for the charcoal to heat up. The lighter fluid is harmful or fatal if swallowed. Lighter fluid may also impart an unpleasant flavor to food cooked upon fires lit with lighter fluid.

To remedy the potentially harmful effects of the lighter fluid, the griller may use a chimney starter. Users stack charcoal in a charcoal chimney and light the charcoal. Filling the charcoal chimney with charcoal can lead to charcoal on the user's hands and clothes. Furthermore, the user may create a mess by spilling charcoal while filling the charcoal chimney.

The known charcoal chimneys are generally constructed from aluminum or steel. The user lights the charcoal and allows the charcoal to heat up. These charcoal chimneys provide a handle to allow the user to dump the hot charcoal from the chimney into the grill. If the user is not careful, the user may spill the charcoal outside of the grill. The spilled charcoal could potentially result in fires, property damage, and bodily harm.

Furthermore, the hot charcoal also raises the temperature of both the chimney and the handle. The user must then grab the heated handle to pour the charcoal. In some instances, the handle is too hot for the user's touch. Because the handle is hot to the touch, the user rushes to pour the hot charcoal and accidentally spills the charcoal. The user may also burn his/her hand by grabbing the heated handle. The user could also drop the chimney due to the heat of the handle thus causing a potential burn and/or fire risk. After dumping the hot coals, the user must also find a protected location to place the chimney to avoid injury and avoid property damage.

The known art does not provide a method of lighting charcoal without using a potentially harmful fluid or without requiring the user to touch a heated handle that could potentially harm the user or property.

Therefore, the present invention is needed to provide a unique device and method for lighting charcoal.

SUMMARY OF THE INVENTION

The present invention utilizes a housing that defines a compartment having an upper chamber and a lower chamber. The housing is constructed from a combustible material. The housing is sufficiently rigid to enable the housing to store and support an amount of charcoal that is stored within the upper chamber of the housing.

A divider separates the upper chamber from the lower chamber. The divider supports the charcoal above the lower chamber. In one embodiment, the divider provides vents that allow air to flow from the lower chamber to the upper chamber. The lower chamber provides space for placement of paper or other combustible material, such as a combustible solid, within the lower chamber. A user lights the combustible material to start a fire and generate heat. The heat and fire from the lower chamber travels upward to the upper chamber to light the charcoal.

The lower chamber provides vents to allow air to flow from outside of the housing and into the housing and the lower chamber. The vents in the lower chamber and the divider provide sufficient air flow to allow the fire to continue without smothering the fire.

It is an object of the present invention to provide a cleaner solution to lighting charcoal for grilling.

It is another object of the present invention to eliminate the need for lighter fluid.

It is another object of the present invention to provide a convenient packaging of charcoal.

It is another object of the present invention to eliminate the mess associated with handling charcoal.

It is another object of the present invention to provide pre-packaged charcoal that assists with lighting the charcoal.

It is another object of the present invention to avoid cooking with harmful chemicals.

It is another object of the present invention to avoid handling hot objects.

It is another object to the present invention to limit handling and pouring of hot charcoal.

It is another object of the present invention to provide a convenient and safe grilling environment.

It is another object of the present invention to provide a prefilled charcoal packaging on the retail level that assists with lighting the charcoal.

It is another object of the present invention to provide a fully combustible charcoal starter.

It is another object of the present invention to eliminate the need to store a heated object.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
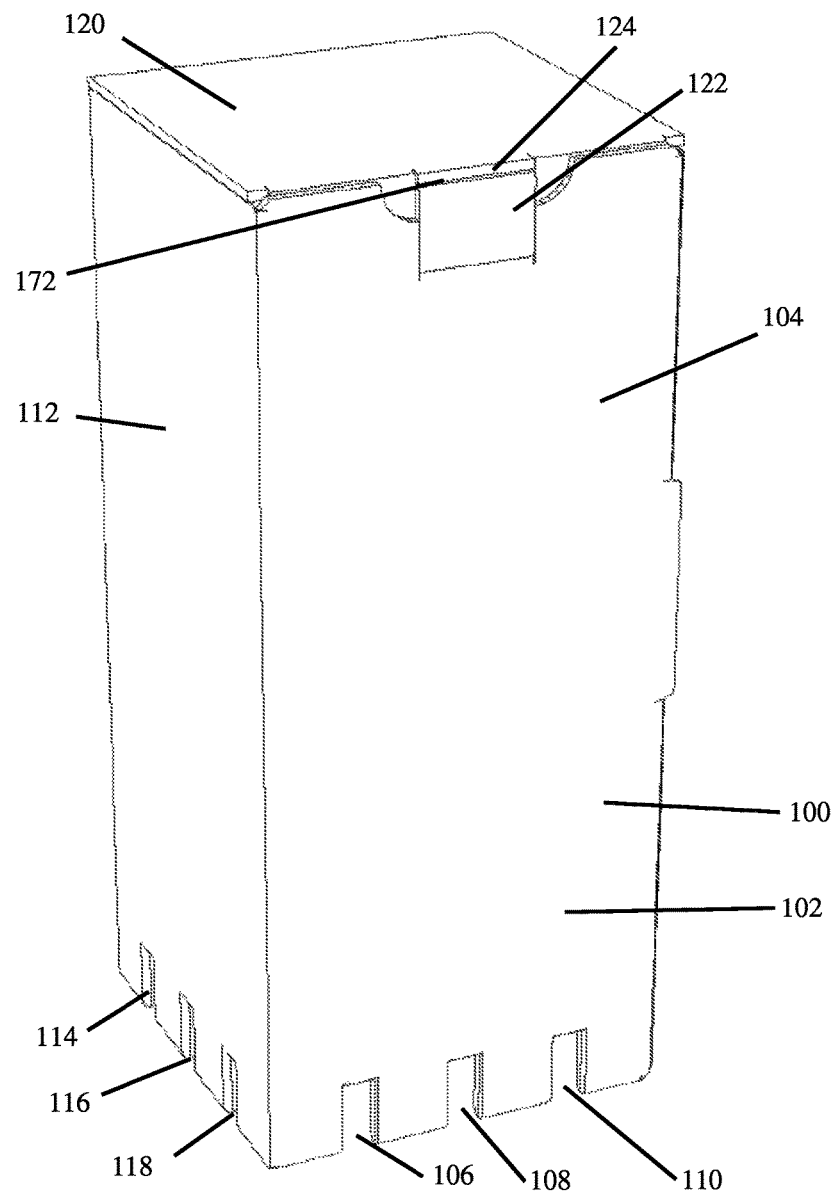
FIG. 1 is a perspective view of one embodiment of the present invention.

FIG. 1 shows a perspective view of one embodiment of the present invention shown as 100. The charcoal starter 100 provides a housing 102 with storage inside of the housing 102. The interior of housing 102 is divided into two different chambers, an upper chamber and a lower chamber. The different chambers enable charcoal to burn within the upper chamber. A fire lit in the lower chamber lights the charcoal in the upper chamber.

The housing 102 is constructed from a sufficiently rigid material, such as cardboard or other rigid material. The housing 102 is also constructed from a combustible material such that the housing will completely burn. The housing 102 stores and supports an amount of charcoal within the upper chamber of the housing 102, above the lower chamber.

Top 120 extending from a side wall of the housing 100 closes the top of the upper chamber. Retention arm 122 and retention finger 124 secure the top 120 in the closed position. Retention finger 124 inserts into an aperture 172 of top 120 to secure the top 120 in the closed position.

Side walls define a vertical axis of the housing 100. In one embodiment, the housing 100 is taller than it is wide or deep. Each side wall 104, 112 provides wall apertures 106, 108, 110, 114, 116, 118 that vent the lower chamber. Wall apertures 106, 108, 110, 114, 116, 118 allow air to flow from outside of the housing 102 to the lower chamber. The wall apertures 106, 108, 110, 114, 116, 118 provide sufficient air flow for lighting the charcoal stored within the upper chamber.

In another embodiment in which the charcoal starter 100 serves as packaging for the charcoal, the charcoal is sealed within packaging, such as a sealed plastic bag or paper bag. The charcoal sealed in packaging is then stored within the upper chamber of the housing. Sealing the charcoal within packaging prevents the charcoal from exiting through wall apertures 106, 108, 110, 114, 116, 118, 128, 130, 132, 136, 138, 140 and divider apertures 144, 146, 148, 150, 152, 204, 206, 208, 210, 182 (FIGS. 3-6 and 8-9). The packaging reduces the amount of charcoal dust and other charcoal debris exiting the housing.

In another embodiment, wall apertures 106, 108, 110, 114, 116, 118, 128, 130, 132, 136, 138, 140 and divider apertures 144, 146, 148, 150, 152, 204, 206, 208, 210, 182 may need to be shut to prevent debris and other materials from exiting the housing 102. The apertures may be sealed with a piece of tape or other sealing material. Such a seal would prevent any charcoal dust or debris from exiting the housing 102.

Figure 2:
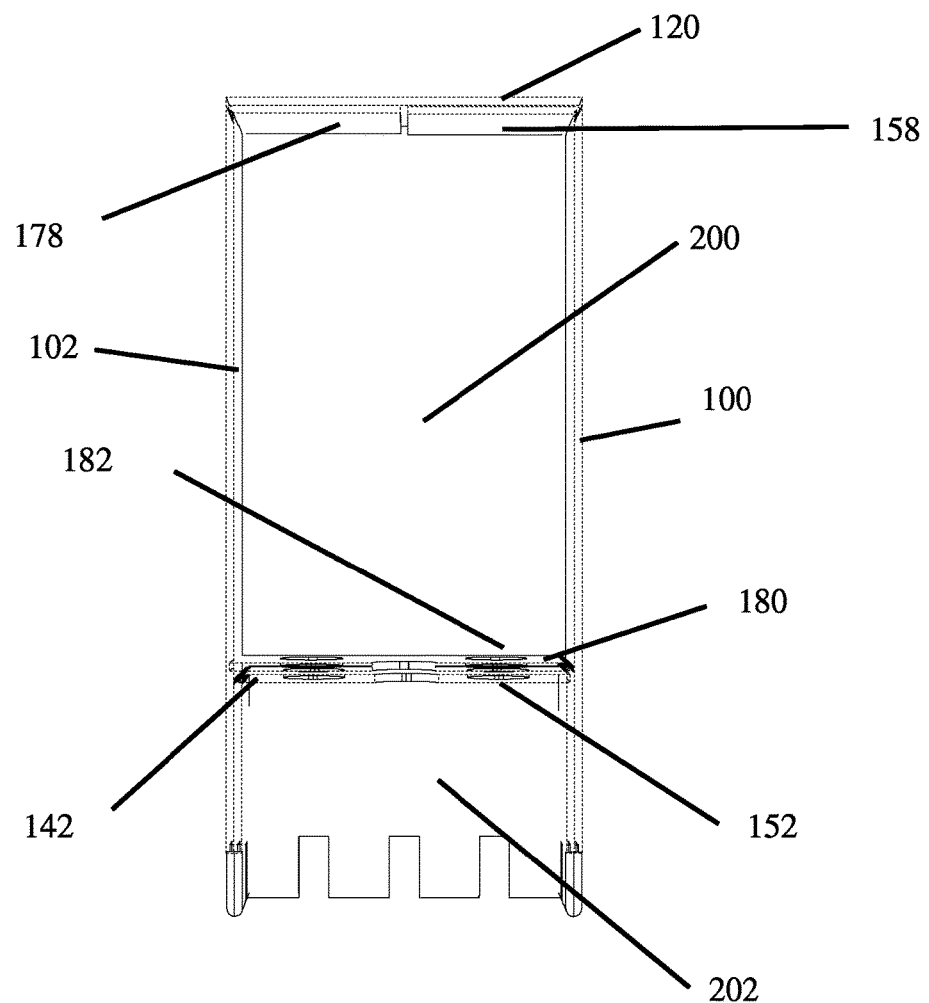
FIG. 2 is a sectional view thereof.

FIG. 2 shows a sectional view of the charcoal starter 100. The charcoal starter 100 provides a housing 102 with an upper chamber 200 and a lower chamber 202. The housing 102 is constructed from a combustible material. The housing 102 is sufficiently rigid to enable the housing to store and support an amount of charcoal that is stored within the upper chamber 200 of the housing 102. In one embodiment, the housing 102 is constructed from cardboard or sufficiently rigid paper product that can burn. Because the housing 102 burns, the user is not required to pour the charcoal or remove the housing 102 from the grill prior to cooking food on the grill.

The dividers 142, 180 separate the upper chamber 200 from the lower chamber 202. The charcoal is stored within upper chamber 200 above dividers 142, 180. The dividers 142, 180 support the charcoal above the lower chamber 202. The dividers 142, 180 may also be constructed from a material that burns such that the entire housing 102 burns during use.

The lower chamber 202 provides space for placement of paper or other combustible material, such as a combustible solid, when lighting the charcoal. The user lights the combustible material within the lower chamber 202 to start a fire and generate heat. The heat and fire from the lower chamber 202 travels upward to the upper chamber 200 to light the charcoal within upper chamber 200. In one embodiment, the dividers 142, 180 provide divider apertures 144, 146, 148, 150, 152, 204, 206, 208, 210, 182 that serve as vents increasing air flow between the lower chamber 202 and the upper chamber 200.

The lower chamber 202 provides wall apertures 106, 108, 110, 114, 116, 118, 128, 130, 132, 136, 138, 140 that serve as vents to increase air flow between outside of the housing 102 and the lower chamber 202. The wall apertures and divider apertures in the lower chamber 202 provide sufficient air flow to allow the fire to continue without smothering the fire.

The heat generated from the fire in the lower chamber 202 lights the charcoal in the upper chamber 200. The fire burns the housing 102 and the charcoal starter 100 of one embodiment thus eliminating the need to remove the housing 102 and charcoal starter 100 from the grill. Such a charcoal starter 100 is designed for a single use application to be burned during use.

In one embodiment, the dividers 142, 180 provide vents that increase air flow between the lower chamber 202 and the upper chamber 200. The lower chamber 202 provides vents within the side walls to allow air to flow into the housing 102 and the lower chamber 202. The vents in the lower chamber 202 and the dividers 142, 180 provide sufficient air flow to allow the fire to continue without smothering the fire.

FIG. 2 shows one embodiment in which the housing 102 provides flaps 158, 178 and top 120. The flaps 158, 178 and top 120 open to provide access to upper chamber 200. When open, flaps 158, 178, and top 120 allow increased air flow through both upper chamber 200 and lower chamber 202.

Flaps 158, 178 and top 120 close to store the charcoal within upper chamber 200 when charcoal starter 100 is not in use. Flaps 158, 178 and top 120 close to seal housing 102 and upper chamber 200. Sealing the housing 102 allows packaging the charcoal starter 100 with charcoal such that the user is not required to fill housing 102 with charcoal.

In one embodiment, the charcoal starter 100 is packaged with the tools needed to light the coals. When packaged for retail and transport, the charcoal is sealed within packaging that is then sealed within the upper chamber 200. The combustible material, such as paper, is stored above the charcoal when packaged for retail and transport. The combustible material is packaged above the charcoal to provide easier access to the combustible material and to reduce damage to the combustible material.

When using the charcoal starter 100, the user opens top 120 and flaps 158, 178 to access the combustible material and the charcoal. The user removes the combustible material and the charcoal from the upper chamber 200. The user pours the charcoal into the upper chamber 200 and places the combustible material 202 into the lower chamber 202. The user then lights combustible material. In one embodiment, the charcoal may be packaged within paper packaging that is then used as the combustible material.

FIG. 3-6 show different views of the charcoal starter 100 with side walls and wall apertures. Housing 102 of one embodiment provides four side walls, walls 104, 112, 126, 134 to form a four sided housing with a closeable top 120. In such, an embodiment, the housing 102 is a parallelepiped shape. The housing may also be a cylinder or other shaped housing that can store charcoal.

As discussed above, the wall apertures within the side walls provide access into the lower chamber 202. Wall extensions of the side walls fold into the interior of housing 102 to support dividers 142, 180. The wall apertures extend from side walls to the wall extensions so that the apertures pass through housing 102 into lower chamber 202.

Figure 3:
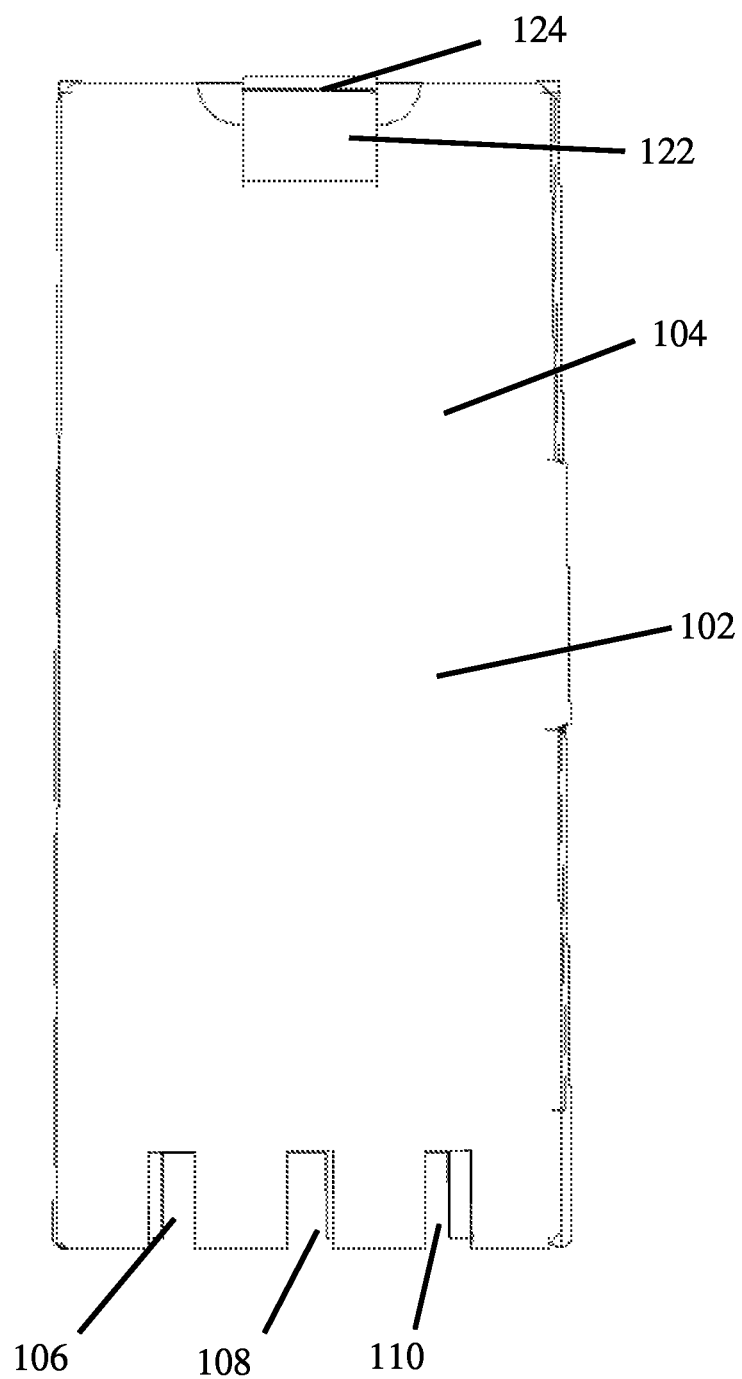
FIG. 3 is a front view thereof.

FIG. 3 shows side wall 104 with wall apertures 106, 108, 110. In one embodiment, the wall apertures 106, 108, 110 extend from the lowest point of housing 102 upward. Such wall apertures 106, 108, 110 increase air flow into the lower chamber 202 and housing 102.

FIG. 3 also shows the placement of retention finger 124 of retention arm 122 into aperture 172 of top 120. Insertion of retention finger 124 into aperture 172 secures the top 120 in the closed position.

Figure 4:
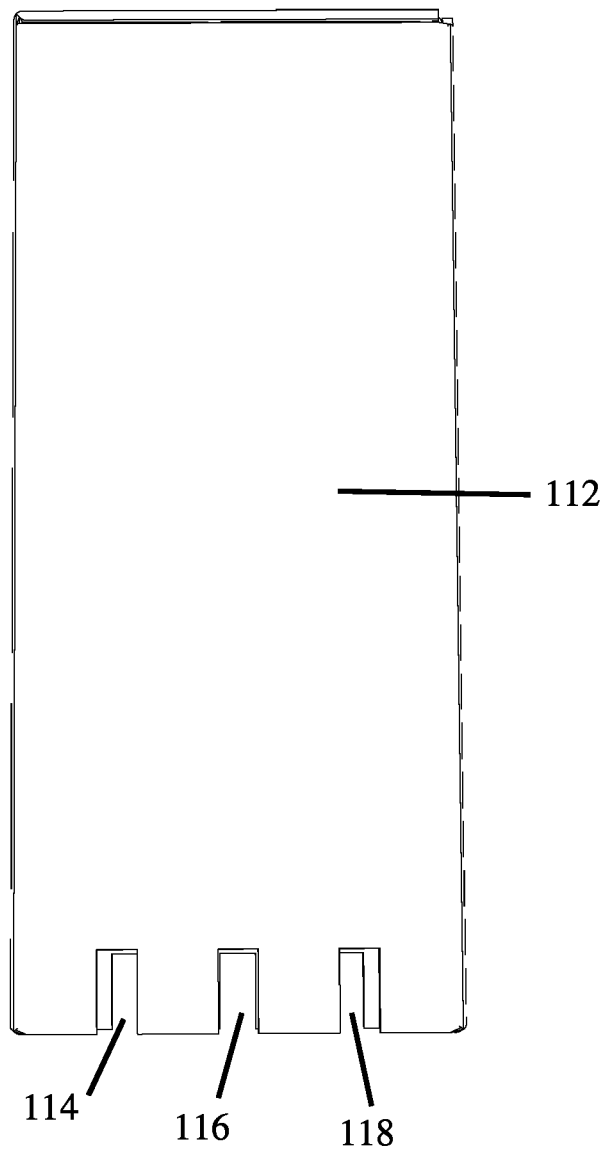
FIG. 4 is a left side view thereof.

FIG. 4 shows side wall 112 with wall apertures 114, 116, 118. In one embodiment, the wall apertures 114, 116, 118 extend from the lowest point of housing 102 upward. Such wall apertures 114, 116, 118 increase air flow into the lower chamber 202 and housing 102.

Figure 5:
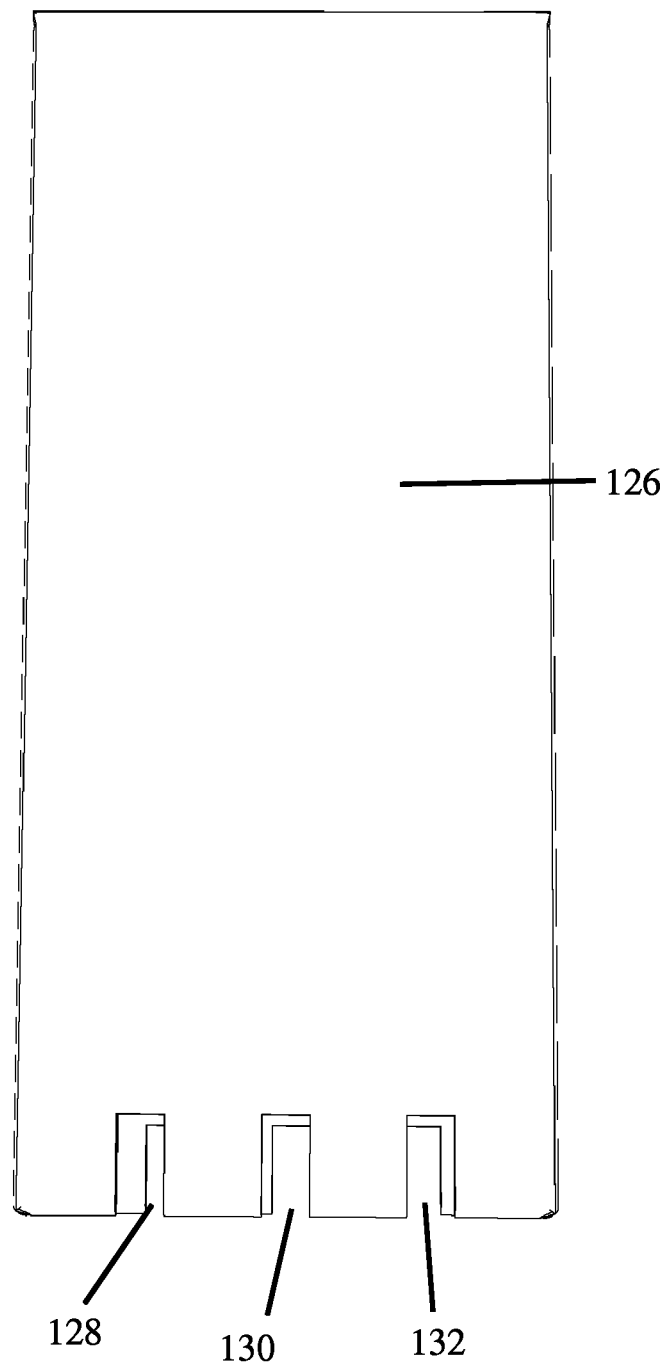
FIG. 5 is a rear view thereof.

FIG. 5 shows side wall 126 with wall apertures 128, 130, 132. In one embodiment, the wall apertures 128, 130, 132 extend from the lowest point of housing 102 upward. Such wall apertures 128, 130, 132 increase air flow into the lower chamber 202 and housing 102.

Figure 6:
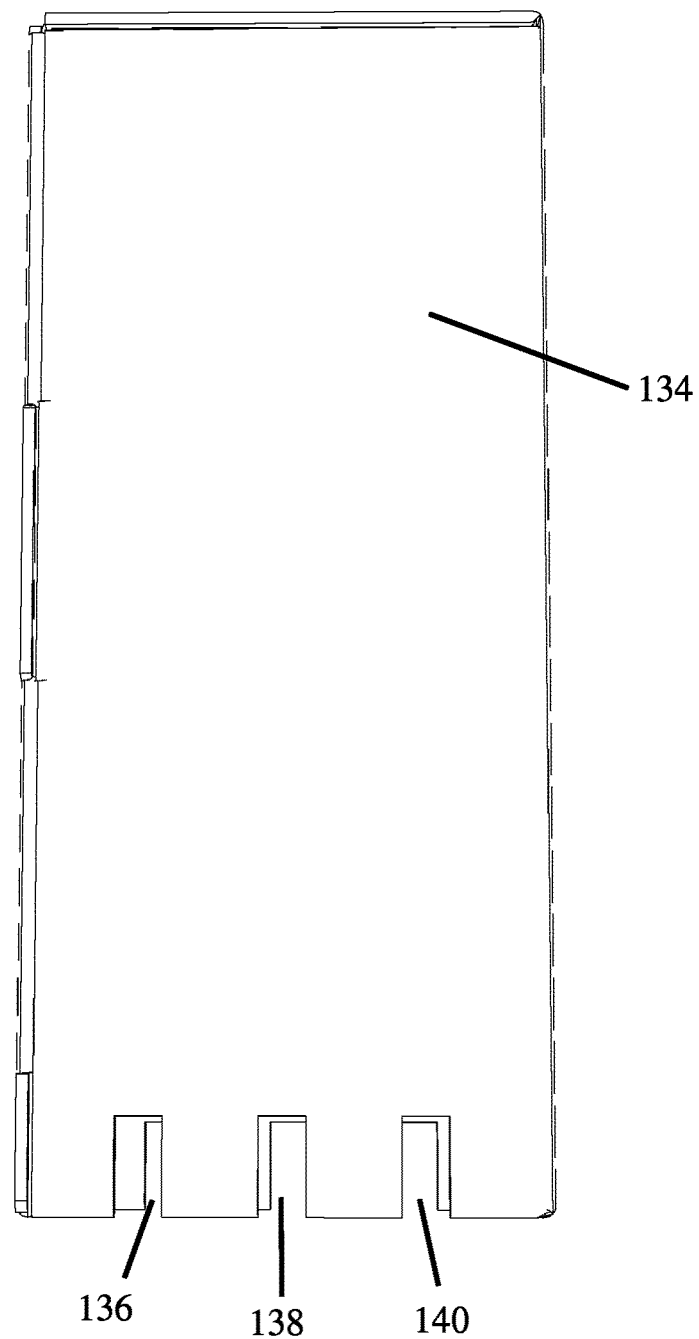
FIG. 6 is a right side view thereof.

FIG. 6 shows side wall 134 with wall apertures 136, 138, 140. In one embodiment, the wall apertures 136, 138, 140 extend from the lowest point of housing 102 upward. Such wall apertures 136, 138, 140 increase air flow into the lower chamber 202 and housing 102.

Figure 7:
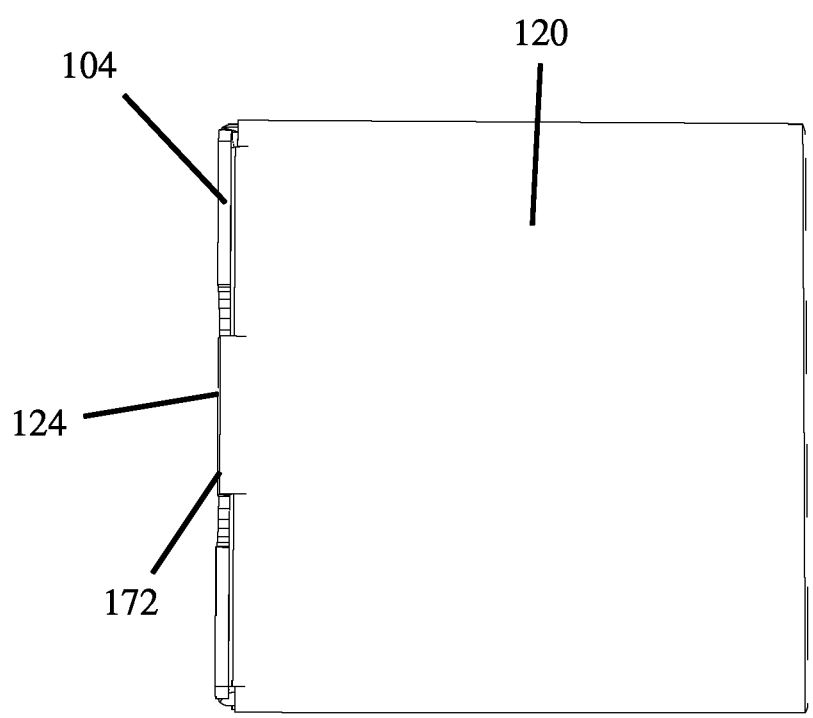
FIG. 7 is a top view thereof.

FIG. 7 shows top 120 and placement of retention finger 124 into aperture 172 of top 120. Insertion of retention finger 124 into aperture 172 secures the top 120 in the closed position. Removing retention finger 124 from aperture 172 allows opening of top 120. Opening top 120 allows access into upper chamber 200. The user can then remove the charcoal and combustible material from upper chamber 200. The user can also leave top 120 and flaps 158, 178 open when igniting the charcoal to increase air flow.

Figure 8:
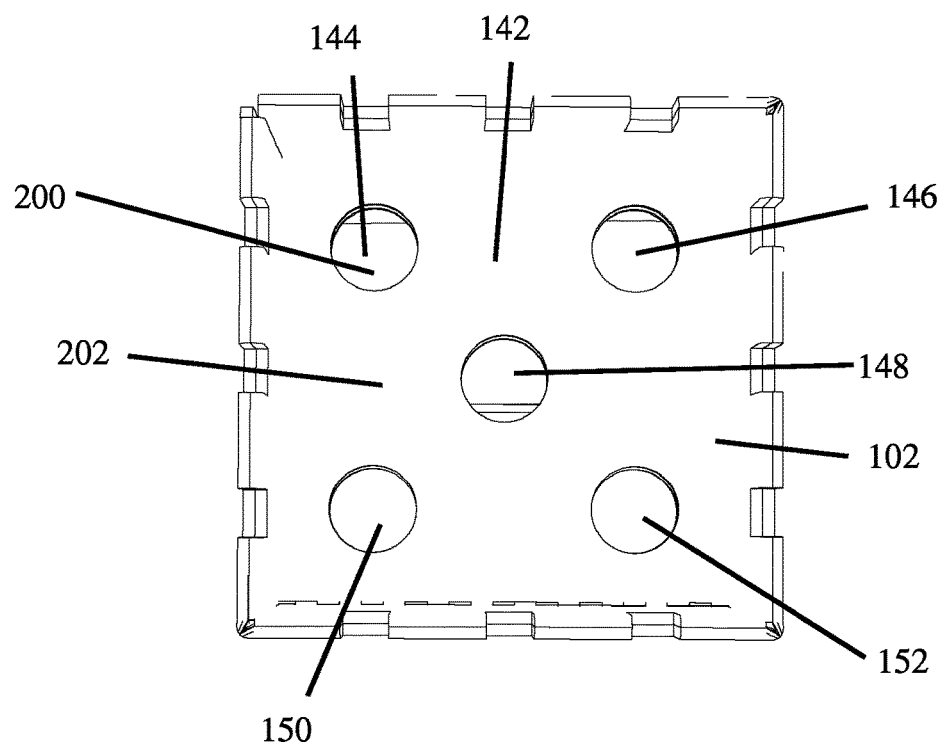
FIG. 8 is a bottom view thereof.

FIG. 8 shows a bottom view of housing 102 and lower chamber 202. The divider 142 separates lower chamber 202 from upper chamber 200. The divider apertures 144, 146, 148, 150, 152 increase air flow between lower chamber 202 and upper chamber 202. The increased air flow reduces the chances that the fire will be smothered.

Figure 11:
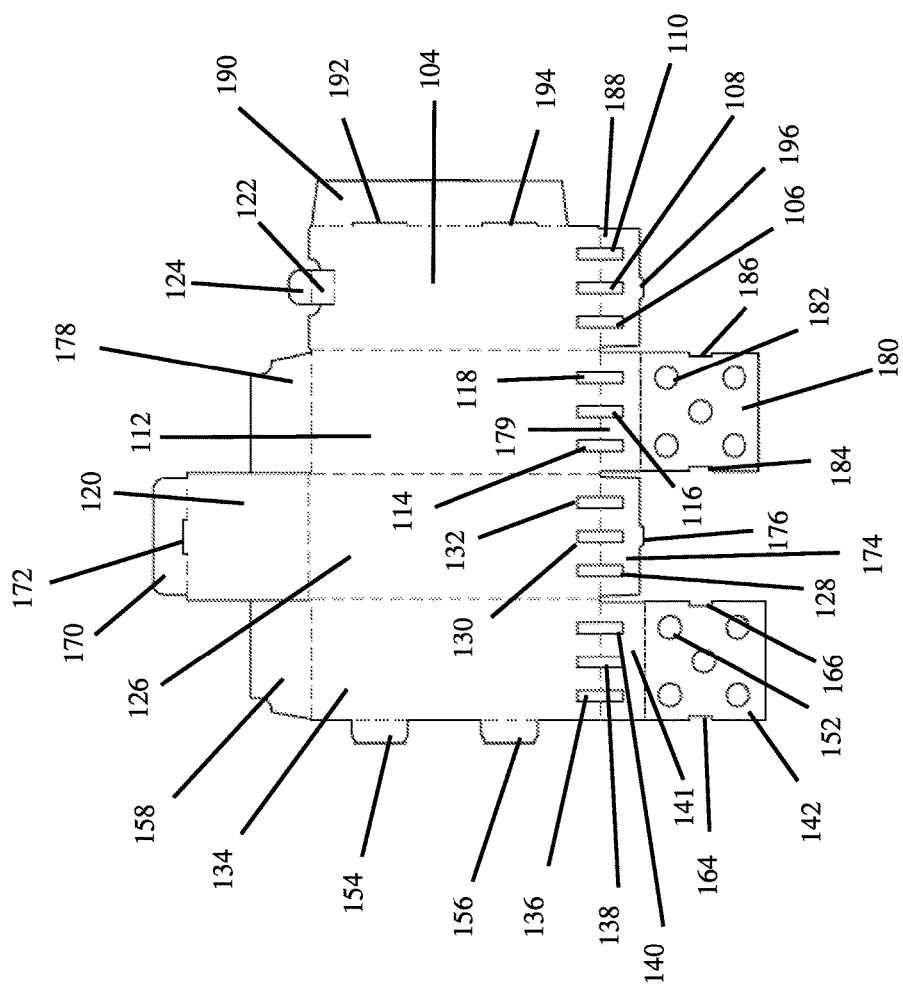
FIG. 11 is a top view of one embodiment of the present invention.

As shown in FIGS. 8 and 11, wall extensions 141, 174, 179, 188 fold towards the interior of housing 102 for placement inside of lower chamber 202. Wall extensions 141, 174, 179, 188 support the lower portion of dividers 142, 180. Wall extensions 141, 174, 179, 188 increase the strength of dividers 142, 180 for supporting the weight of the charcoal stored within upper chamber 200.

Figure 9:
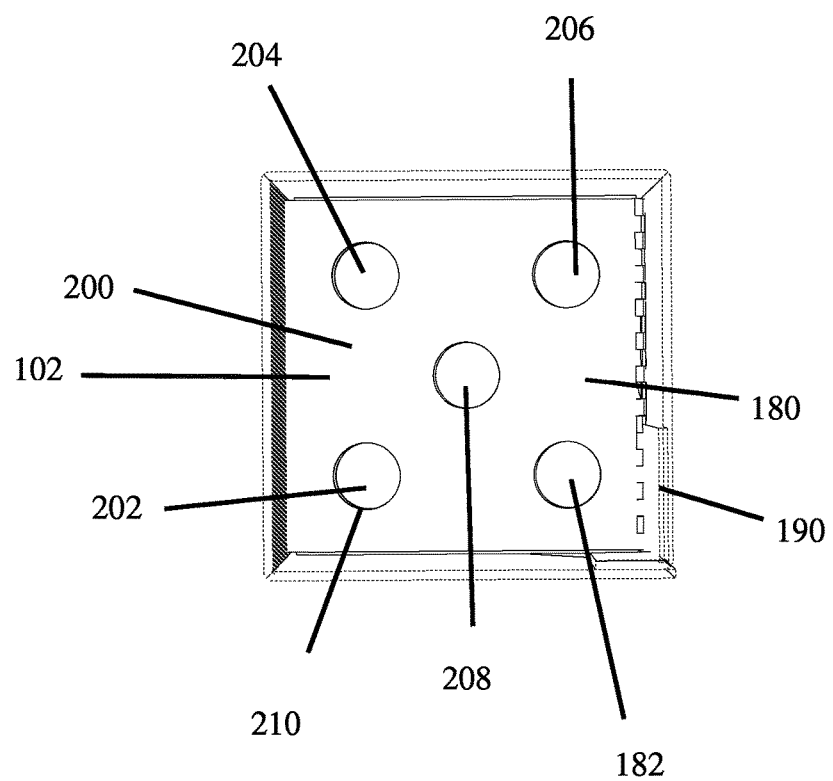
FIG. 9 is a sectional view thereof.

FIG. 9 shows a sectional view from upper chamber 200 downwards to lower chamber 202. The divider 180 separates upper chamber 200 from lower chamber 202. The divider apertures 204, 206, 208, 210, 182 increase air flow between lower chamber 202 and upper chamber 202. The increased air flow reduces the chances that the fire will be smothered. In one embodiment, the divider apertures 144, 146, 148, 150, 152 of divider 142 align with divider apertures 204, 206, 208, 210, 182 of divider 180.

FIGS. 8-9 show dividers 142, 180 with divider apertures 144, 146, 148, 150, 152, 204, 206, 208, 210, 182. The dividers 142, 180 of one embodiment are sized such that the ends and sides of the dividers 142, 180 contact the interior sides of the housing 102 to increase friction to help support charcoal placed on top of the dividers 142, 180.

The divider apertures 144, 146, 148, 150, 152, 204, 206, 208, 210, 182 increase air flow between lower chamber 202 and upper chamber 200. As discussed below, wall extensions 141, 174, 179, 188 support the dividers 142, 180.

Figure 10:
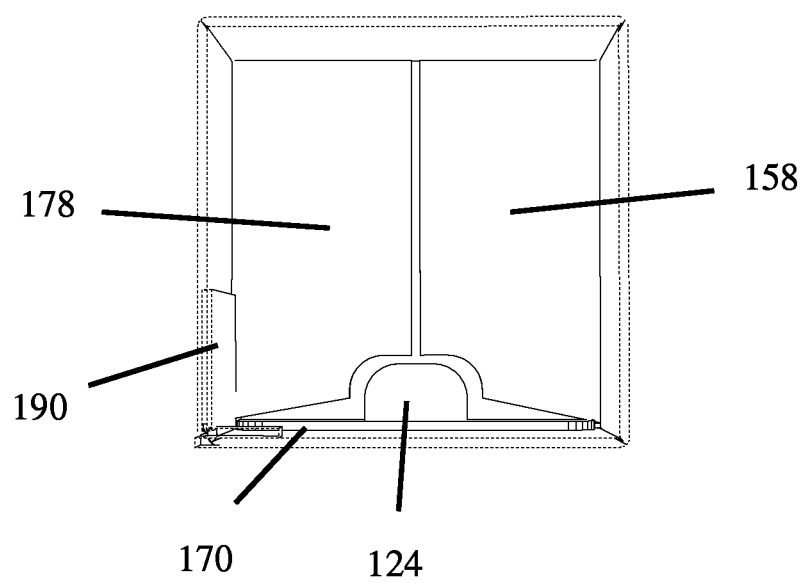
FIG. 10 is a sectional view thereof.

FIG. 10 shows a sectional view within upper chamber 202 upwards towards top 120 and flaps 158, 178. Top extension 170 of top 120 is placed within the interior of housing 102 at upper chamber 200. Retention finger 124 inserts into aperture 172 to secure the flaps 158, 178 into the closed position.

FIG. 10 also shows side extension 190 that extends from wall 104. In one embodiment, side extension 190 is secured to the interior of side wall 134 to form housing 102. In one embodiment, the side extension 190 attaches to wall 134 via an adhesive, such as glue, a non-toxic adhesive, tape, or some other adhering agent. As shown in FIG. 11, Attachment fingers 154, 156 are also placed within apertures 192, 194 to form housing 102.

FIG. 11 shows an unassembled view of the housing. Each wall 104, 112, 126, 134 is folded at the dotted line to form the walls of housing. Wall extensions 141, 174, 179, 188 fold inwards towards the lower chamber 202 interior of housing. The wall extensions 141, 174, 179, 188 support dividers 141, 180.

The dividers 142, 180 are located above the bottom of housing as shown in FIG. 2. In one embodiment, dividers 142, 180 are located a distance equal to or approximate to the vertical height of the wall extensions 141, 174, 179, 188.

Extension finger 176 is inserted between side wall 126 and apertures 166, 184 of dividers 142, 180. Similarly, extension finger 190 is inserted between side wall 104 and apertures 186, 164 of dividers 180, 142. The extension fingers 176, 196 maintain the positioning of wall extensions 141, 174, 179, 188 to support the charcoal within upper chamber 200.

Flaps 158, 178 provide an aperture for placement of retention finger 124 of retention arm 122 into aperture 172 of top 120 as shown in FIG. 10. Folding top extension 170 into the interior of housing allows insertion of retention finger 124 into aperture 172. Flaps 158, 178 and top 120 seal the top of the housing 102 to secure the charcoal within upper chamber 200. The user may open flaps 158, 178 to increase air flow.

As discussed above, wall apertures 106, 108, 110, 114, 116, 118, 128, 130, 132, 136, 138, 140 increase air flow through housing 102. Wall apertures 106, 108, 110, 114, 116, 118, 128, 130, 132, 136, 138, 140 extend vertically from walls 104, 112, 126, 134 onto wall extensions 141, 174, 179, 188 to maintain vents when wall extensions 141, 174, 179, 188 are folded to the interior of housing within lower chamber 202. Wall apertures 106, 108, 110, 114, 116, 118, 128, 130, 132, 136, 138, 140 also provide access to the lower chamber 202 for igniting the combustible material. The user may insert a match or other fire source, such as a lighter or other lit object, into one of the wall apertures 106, 108, 110, 114, 116, 118, 128, 130, 132, 136, 138, 140 to light the combustible material in the lower chamber 202.

The dividers 142, 180 separate the upper chamber 200 and lower chamber 202 Divider apertures 144, 146, 148, 150, 152, 204, 206, 208, 210, 182 increase the air flow between lower chamber 202 and upper chamber 200. The divider apertures 144, 146, 148, 150, 152, 204, 206, 208, 210, 182 are sized such that most, if not all, of the charcoal cannot pass through the vents and flow into the lower chamber 202. Therefore, most, if not all, of the charcoal will remain in upper chamber 200 instead of lower chamber 202.

Figure 12:
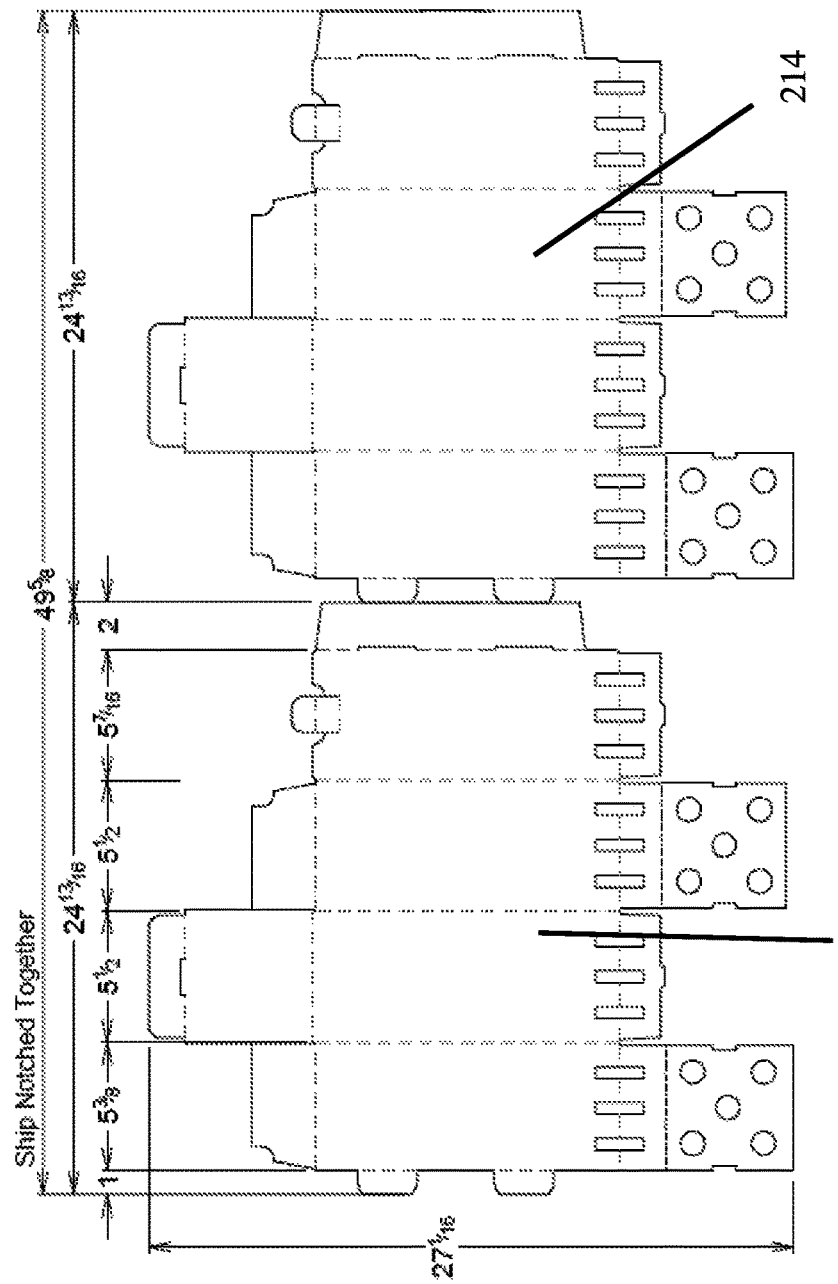
FIG. 12 is a top view of one embodiment of the present invention.

FIG. 12 shows a top view of two housings 212, 214 unassembled. The housings are shipped notched together. FIG. 12 also shows the dimensions of a housing of one embodiment and the components of the housing. The dimensions may increase or decrease according to the needs of the user.

The present invention also provides a method of lighting charcoal. The user places the housing 102 and the charcoal starter 100 in the location in which the charcoal is to be lit, such as a grill or fire pit. In one embodiment, the charcoal starter 100 may serve as packaging for the charcoal such that the user may purchase the charcoal packaged within the charcoal starter 100. The upper chamber 200 of such an embodiment is prefilled with charcoal such that the user may purchase the charcoal starter 100 at least partially filled with charcoal at the retailer.

The charcoal may be sealed in packaging to eliminate the dust and other debris that may be caused by the charcoal. The sealed charcoal may then be packaged in the housing. A combustible material, such as paper, may also be packaged within the upper chamber. The combustible material may be packaged above the charcoal to avoid damage to the combustible material. The combustible material may include, but is not limited to, paper, cardboard, paper product, a candle, etc.

The charcoal is stored in an upper chamber 200 of a combustible housing 102. A combustible material is placed within a lower chamber 202 located below the upper chamber 200. In one embodiment, the charcoal starter 100 may be packaged with the combustible material already stored within the lower chamber 202.

The user may open flaps 158, 178 and top 120 to increase the air flow through housing 102. The user could also maintain the flaps 158, 178 and top 120 in the closed position. The user then lights the combustible material stored in the lower chamber 202. As the combustible material burns, the charcoal begins to burn. The hot charcoal and the combustible material burn the housing 102 and the charcoal starter 100 such that the user does not have to pour the charcoal into the grill or remove the housing from the grill. Instead, the fire consumes the charcoal starter 100 such that the user simply grills on top of the hot charcoal.

The charcoal starter has been shown as a parallelepiped structure. The starter may be configured as a cube, cylinder, or other shape that allows for storage of the charcoal within a combustible housing. The charcoal starter of one embodiment stores lump charcoal. Other embodiments may store charcoal briquettes.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A device for storing charcoal to be ignited by a combustible material stored within the device, the device comprising:
    a housing for storing the charcoal inside of the housing wherein the housing is constructed from a combustible material;
    an upper chamber of the housing located interior of the housing for storing the charcoal;
    a lower chamber of the housing located interior of the housing for placement of the combustible material when lighting the charcoal;
    a bottom of the housing
    a central opening in the bottom;
    a side wall of the housing;
    a wall extension that extends upward from a lowest portion of the side wall of the housing, the side wall folding upward into the central opening into the lower chamber to form the wall extension, wherein the lower chamber extends through the central opening below the bottom of the housing;
    a first divider extending from the wall extension, the first divider folding transversely across the central opening, the first divider separating the upper chamber from the lower chamber, the first divider constructed from a combustible material wherein the first divider is formed from the housing such that the first divider, the wall extension, and the housing are a single unitary piece; and
    a first wall aperture located on the side wall of the housing providing an opening from the exterior of the housing into the lower chamber wherein the first wall aperture is located below the first divider.

2. The device of claim 1 further comprising:
    the charcoal stored within the upper chamber.

3. The device of claim 2 wherein the upper chamber is larger than the lower chamber.

4. The device of claim 1 wherein the housing is parallelepiped.

5. The device of claim 1 further comprising:
    at least one divider aperture located on the first divider, the divider aperture providing an opening between the upper chamber and the lower chamber for air to flow between the upper chamber and the lower chamber.

6. The device of claim 2 further comprising:
    the combustible material placed within the lower chamber to be ignited.

7. The device of claim 6 wherein the combustible material is paper.

8. The device of claim 7 wherein the housing seals the charcoal within the upper chamber.

9. The device of claim 8 wherein the housing seals the paper within the upper chamber above the charcoal.

10. The device of claim 1 wherein the charcoal is sealed within a package prior to storage within the upper chamber of the housing.

11. The device of claim 1 further comprising:
a second divider located vertically above the lower chamber, the second divider separating the upper chamber from the lower chamber, the second divider constructed from a combustible material wherein the first divider is located below the second divider to support the second divider.

12. The device of claim 11 further comprising:
a divider aperture of the first divider providing an opening between the upper chamber and the lower chamber; and
a divider aperture of the second divider providing an opening between the upper chamber and the lower chamber wherein the divider aperture of the first divider aligns with the divider aperture of the second divider to provide an opening between the upper chamber and the lower chamber.

13. The device of claim 1 wherein the first divider extends across at least half of the lower chamber on a plane.

14. The device of claim 13 wherein the first divider extends across the lower chamber without significantly sloping upward.

15. A device for storing charcoal to be ignited by a combustible material stored within the device, the device comprising:
a housing storing the charcoal wherein the housing is constructed from a combustible material, the housing having a larger vertical dimension than horizontal dimension and depth;
a first side wall of the housing wherein the side wall defines a vertical axis;
a second side wall of the housing extending vertically;
a top of the housing located vertically above the side wall;
a bottom of the housing located vertically below the side wall;
an upper chamber located interior of the housing, the upper chamber storing the charcoal;
a lower chamber located interior of the housing, the lower chamber located vertically below the upper chamber; the lower chamber providing space for placement of the combustible material when lighting the charcoal;
a first divider located vertically above the lower chamber, the first divider separating the upper chamber from the lower chamber, the first divider constructed from a combustible material;
a central opening in the bottom of the housing wherein the central opening is located below the first divider between the first side wall and the second side wall;
a wall extension of the first side wall extending vertically upward from the bottom of the first side wall to the first divider, the wall extension formed by folding the first side wall through the central opening to extend upward into the lower chamber, the wall extension forming the central opening, wherein the wall extension vertically supports the first divider, wherein the first divider is formed by folding the wall extension transverse to the vertical axis, wherein the first side wall, wall extension, and first divider are a single unitary piece;
a wall aperture located on the first side wall of the housing providing an opening from the exterior of the housing into the lower chamber.

16. The device of claim 15 wherein the upper chamber is larger than the lower chamber.

17. The device of claim 16 further comprising:
at least two wall apertures located on the first side wall of the housing providing an opening from the exterior of the housing into the lower chamber.

18. A device for storing charcoal to be ignited by a combustible material stored within the device, the device comprising:
a housing storing the charcoal interior of the housing wherein the housing is constructed from a combustible material;
a first side wall of the housing wherein the first side wall defines a vertical axis;
a second side wall of the housing extending along the vertical axis;
a top of the housing located vertically above the first side wall;
a bottom of the housing located vertically below the first side wall;
a central opening in the bottom of the housing wherein the central opening is defined by the first side wall and the second side wall;
an upper chamber located interior of the housing, the upper chamber storing the charcoal;
a lower chamber located interior of the housing, the lower chamber located vertically below the upper chamber; the lower chamber providing space for placement of the combustible material when lighting the charcoal, the lower chamber extending vertically downward through the central opening at the bottom of the housing
a first divider located vertically above the lower chamber, the first divider separating the upper chamber from the lower chamber, the first divider constructed from a combustible material, the first divider located above the bottom of the housing such that the first side wall extends vertically below the first divider wherein the first divider is a wall extension of the first side wall such that the first side wall and the first divider are a single unitary piece wherein the first divider is formed by folding a lower portion of the first side wall upward into the central opening into the lower chamber to form the bottom of the housing at the first side wall, the first divider extending laterally across at least half of the lower chamber from the first side wall towards the second side wall;
the wall extension extending vertically upward from the bottom of the housing and the first side wall wherein the first wall extension contacts the first divider to support the first divider;
a first wall aperture located on the first side wall of the housing; and
a first extension aperture located on the wall extension, wherein the first wall aperture aligns with the first extension aperture to provide an opening from the exterior of the housing through the first side wall and wall extension into the lower chamber.

19. The device of claim 18 further comprising:
at least two wall apertures located on a side of the housing adjacent to the lower chamber, the wall apertures providing openings from the exterior of the housing into the lower chamber to increase air flow between outside of the housing and the lower chamber, wherein the wall apertures are located below the first divider;
the wall apertures extending from the side of the housing through the wall extension.

20. The device of claim 18 further comprising:
a second divider located vertically above the lower chamber, the second divider separating the upper chamber from the lower chamber, the second divider constructed from a combustible material, the second divider located above the bottom of the housing such that the second side wall extends vertically below the second divider, wherein the second divider is a wall extension of the second side wall such that the second side wall and the second divider are a single unitary piece wherein the second divider is formed by folding a lower portion of the second side wall upward into the central opening into the lower chamber to form the bottom of the housing at the second side wall, the second divider extending laterally across at least half of the lower chamber from the second side wall towards the first side wall;

the wall extension of the second wall extending vertically upward from the bottom of the housing and the second side wall wherein the wall extension of the second wall contacts the second divider to support the second divider, wherein the wall extension of the first wall and the wall extension of the second wall define the central opening at the bottom of the housing;

a divider aperture of the first divider providing an opening between the upper chamber and the lower chamber; and a divider aperture of the second divider providing an opening between the upper chamber and the lower chamber wherein the divider aperture of the first divider aligns with the divider aperture of the second divider to provide an opening between the upper chamber and the lower chamber.

\* \* \* \* \*